US006453277B1

(12) United States Patent
Helsley et al.

(10) Patent No.: US 6,453,277 B1
(45) Date of Patent: Sep. 17, 2002

(54) VIRTUAL I/O EMULATOR IN A MAINFRAME ENVIRONMENT

(75) Inventors: David L. Helsley, Glastonbury; Michael R. Chase, Farmington, both of CT (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/239,476

(22) Filed: Jan. 28, 1999

(51) Int. Cl.$^7$ .................................................. G06F 9/44
(52) U.S. Cl. .............................. 703/24; 703/20; 703/21; 703/27; 711/112
(58) Field of Search .................. 703/24, 27, 20, 703/21; 711/111, 112, 4, 6, 2, 168; 710/36, 48

(56) References Cited

U.S. PATENT DOCUMENTS

| | | | |
|---|---|---|---|
| 4,855,905 A | * 8/1989 | Estrada et al. | 364/200 |
| 5,206,939 A | * 4/1993 | Yanai et al. | 395/400 |
| 5,377,337 A | * 12/1994 | Antognini et al. | 395/375 |
| 5,530,845 A | * 6/1996 | Hiatt et al. | 395/500 |
| 5,592,648 A | * 1/1997 | Schultz et al. | 395/441 |
| 5,598,549 A | * 1/1997 | Rathunde | 395/441 |
| 6,070,224 A | * 5/2000 | LeCrone et al. | 711/112 |
| 6,185,653 B1 | * 2/2001 | Yanai et al. | 711/4 |
| 6,260,006 B1 | * 7/2001 | Wong et al. | 703/27 |
| 6,260,110 B1 | * 7/2001 | LeCrone et al. | 711/112 |

OTHER PUBLICATIONS

Computer Network Technology, "Y2K Update," 2 pages http.www.cnt.com/index2.htm, Printed Jan. 6, 2000.
Computer Network Technology, "Products, " 1 page http.www.cnt.com/products/index.htm, Printed Jan. 6, 2000.
Computer Network Technology, "Networking Products," 1 page http.www.cnt.com/products/networking/index.htm, Printed Jan. 6, 2000.
Computer Network Technology, "Channelink Director," 1 page http.www.cnt.com/products/networking/channelink.htm, Printed Jan. 6, 2000.

* cited by examiner

Primary Examiner—Kevin J. Teska
Assistant Examiner—Thai Phan
(74) Attorney, Agent, or Firm—Baker Botts L.L.P.

(57) ABSTRACT

A method and system of emulating an input/output (I/O) device in a mainframe environment. A started task executing as part of the operating system gains control of I/O instructions directed to virtual devices by insuring that such I/O instructions cause interrupts. The started task then hooks the branch point for such interrupts. Upon obtaining control, the started task causes the I/O source to believe a transaction with a predefined data space in a general storage area on board the mainframe is actually a transaction with a physical device.

38 Claims, 13 Drawing Sheets

VIRTUAL I/O EMULATOR IN A MAINFRAME ENVIRONMENT

BACKGROUND

(1) Field of the Invention

The invention relates to input/output (I/O) in a mainframe computer system. More specifically, the invention relates to virtualizing I/O in a mainframe computer system.

(2) Background

A typical mainframe may have up to ten central processing units (CPUs). An operating system (O/S), such as OS390, MVS ESA, VM or VSE, available from International Business Machines (IBM), typically executes on the mainframe and provides an interface between the hardware and higher level software. The O/S traditionally defines six classes of interrupts: program check (PC), supervisor call, I/O, machine check, external and restart. PC interrupts are generally bad, signifying that code is bad and usually results in failure. Conversely, some interrupts occur routinely, such as an I/O interrupt to indicate completion of an I/O transaction. Each CPU has associated therewith a prefix save area (PSA) that contains pointers to the interrupt service routines for handling each of these interrupt classes. Some software designers have employed this feature to reroute interrupt service requests by supplying a different address such that when an interrupt of that class occurs, the O/S routes the request to a custom interrupt handler. For example, one vendor rerouted the PC interrupt branch point to log information relating to system failure.

A typical mainframe conducts a very large amount of I/O. To facilitate this, up to 256 I/O channels may exist. Each I/O channel is identified by a channel path identifier (CHPID). Each CHPID may be coupled to a control unit which is a computer that may be connected to multiple I/O devices of a single type. For example, a single control unit might be connected to a plurality of direct access storage devices (DASD) or a plurality of tape drives. This leads to geometric growth of I/O devices to which the mainframe might be connected. Additionally, some prior art systems also permit daisy chaining of control units so that any particular CHPID may, via the daisy chain, reach an arbitrarily large number of control units. Other techniques, such as ESCON introduce a switch between the CHPID and a plurality of control units. These techniques exacerbate the proliferation of the number of possible devices connected to a mainframe. A further complication of I/O in the mainframe environment is that multiple mainframes are able to share one or more control units. Thus, in addition to having an I/O system that is extraordinarily scalable, the I/O system must also facilitate sharing between multiple mainframes.

Tape as a storage medium for mainframes is extremely important. The tape is used for archival purposes and commonly as a primary storage medium. Often, tape is used even for short term storage where the file size from day to day varies significantly such that it is difficult to effectively allocate DASD space for the file. Vast and expensive tape management subsystems have been developed which prevent tapes once written from being overwritten until otherwise authorized.

Commonly, tape cartridges are available in 400 MB, 800 MB, and more recently, 10 GB and 20 GB sizes. The tape capacity is expected to continue to increase. Unfortunately, a typical application seeking access to a tape in which to store its data set is not likely to fill up an entire tape. Thus, if, for example, the data set is 100 MB, the tape size is 400 MB, the application will gain access to the tape, store its data set, close the tape, and the tape will remain underutilized for the period that that data must be archived. This has resulted in significant under-utilization of tape cartridges such that, on average, cartridges may be only 25% utilized. While it is, of course, possible in a mainframe environment to put multiple data sets having different formats on a tape, it is not generally done because it requires an agreement between the potential users to allocate the tape capacity. As the number of applications seeking access to the tape increases, the management overhead becomes prohibitive.

This problem led to the development of a software stacking product to try to improve capacity utilization. Generally, after a plurality of applications have placed their data on a plurality of different tapes, the software stacking products load the tapes and move data from one tape to another. This uses mainframes resources and also creates the potential problem that the application may remember where it stored the data, e.g. the particular cartridge number, resulting in recovery errors. Moreover, if a single application wants two data sets simultaneously stacked on the same tape, failure may result. Also, even if two applications are searching data sets from the same tape, one must wait until the first completes its access. This may significantly negatively impact the main frames ability to do batch processing. As a result of these logistical and overhead problems, the software stacking products have largely failed to satisfy the capacity issues existing in the industry.

Typical tape systems are leased because turnover in technology makes purchasing them economically impractical. One problem with existing hardware tape drives is that they require a large amount of physical space and tend to be quite expensive. For example, if a user wants 64 drives (to permit up to 64 applications to simultaneously write to tape), significant amounts of physical area must be allocated to those drives. In addition to the floor space, the lease for such systems usually includes a maintenance charge on a per drive basis, including a drive automation, that may be on the order of $1000 per month. Thus, in the 64 drive example, $64,000 a month is spent purely in maintenance charges for the physical drives. The underutilization problem further increases costs as a large number of cartridges are required to hold less data.

More recently, vendors, such as IBM and Storage Technology, Inc., have come out with hardware virtual tape systems. The IBM system employs an RS 6000 to look like a control unit. The RS 6000 is associated with a DASD and six tape drives. Thus, when an application sends data to the virtual tapes, the RS 6000 loads the data set into the DASD and then migrates it to the tape later. The system permits emulation of 64 tape drives with only six physical drives, and thus, 64 applications may believe they are writing simultaneously to tape even though only six physical drives exist. While this solution does save significant floor space, it still involves significant hardware investment costs and maintenance costs. Additionally, it has limited scalability because for each unit, you must incur an additional hardware cost. Finally, the IBM solution uses a proprietary storage format which is not generally readable by other storage tape drives. Thus, for those users that wish to share data over long distances, the IBM solution may not be suitable.

BRIEF SUMMARY OF THE INVENTION

A method and system of emulating an input/output (I/O) device in a mainframe environment is disclosed. A started task executing as part of the operating system gains control of I/O instructions directed to virtual devices by insuring that such I/O instructions cause interrupts. The started task then hooks the branch point for such interrupts. Upon obtaining control, the started task causes the I/O source to believe a transaction with a predefined data space in a general storage area on board the mainframe is actually a transaction with a physical device.

DETAILED DESCRIPTION

Figure 1:
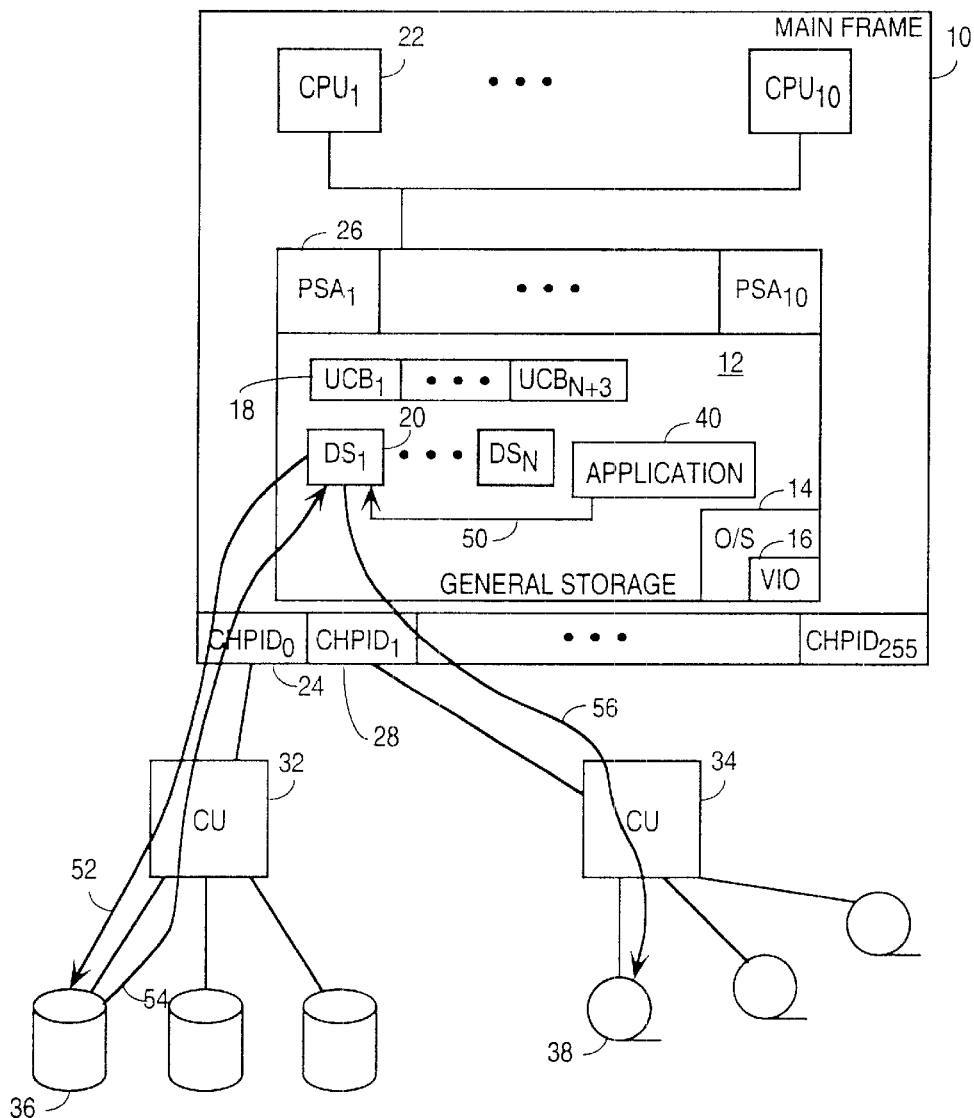
FIG. 1 is a block diagram of a mainframe environment of one embodiment of the invention.

A method and apparatus to perform on board virtualization of I/O in a mainframe environment is described. In one embodiment, the virtualization is performed by a started task executing as part of the operating system (O/S) at a low level near the interface between hardware and software. One embodiment permits emulation of tape drive, significantly reducing the number of physical drives required. The virtual drives appear to a user as any physical tape drive. However, the virtual drives do not require the monetary outlays expected with physical drives.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it should be appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

FIG. 1 is a block diagram of a mainframe environment of one embodiment of the invention. A mainframe 10 includes a CPU 22 and may include up to nine additional CPUs. CPU 22 is coupled to a general storage unit 12 which is volatile memory on board the mainframe 10. CPU 22, and each other CPU has defined within the general storage unit 12 a prefix save area (PSA). PSA 26 corresponds to CPU 22. From an addressing standpoint, the PSA corresponding to the particular CPU is always regarded as absolute zero. The PSA stores status and addresses for branch points to which the CPU is going to branch in the event that particular interrupts occur. This will be described in greater detail below.

Operating system (O/S) 14 also resides in the general storage unit and oversees and manages the interfaces between the mainframe hardware and software, such as application 40, which may be executed by the CPU. A virtual I/O emulator (VIO) is a started task executing as part of O/S 14. O/S 14 may, for example, be OS390, available from IBM. VIO 16 is designed to emulate N I/O devices, where N may be an arbitrarily large number. Typical values of N where the I/O device emulated is a tape drive will be 32, 64 or possibly even 512. For each emulated device, VIO reserves a data space 20 within virtual storage. Accordingly, there will be N such data spaces defined. Alternatively, VIO 16 may reserve data spaces only when access to an emulated device up for allocation. In such an embodiment, only data spaces for those devices to which access is being sought will be reserved within the general storage unit. Each device whether virtual or physical will have a unit control block (UCB) defined within the common address space of the general storage unit 12. Accordingly, assuming VIO 16 emulates N tape drives, there will be N+P UCBs corresponding to tape drives, where P is the number of physical drives present. Consistent with the prior art, mainframe 10 has up to 256 CHPIDs, including CHPID 24 and CHPID 28. CHPID 24 is connected to control unit 32, which controls a DASD farm, including DASD 36. CHPID 28 is coupled to control unit 34, which controls the physical tape drives, including tape drive 38.

Assuming application 40 wishes to write a data set to tape, it will request access to a tape drive. From the application's perspective, virtual and physical tape drives, i.e. those tape drives emulated by VIO 16, and those physical drives, such as drive 38, appear exactly the same. Allocation is performed in the usual manner with the O/S handling the handout of the available tape drives (including virtual tape drives). If the O/S 14 allocates a first virtual drive to application 40, the write request is then translated by lower level software in a conventional manner to open a subchannel across which the write may flow to the I/O device. By appropriately controlling the subchannel identification (SID) contained in UCB 18, an interrupt is generated when the CPU attempts to execute the I/O instruction. VIO 16 then takes control of the transaction, causing the application to write its data set following path 50 into data space 20. While it is possible that a sufficient data space may be allocated to hold the entire data set, to conserve space in general storage 12, VIO 16 will typically allocate a smaller data space 20 and export blocks of the data set asynchronously via path 50 through CHPID 24 and control unit 30 down to DASD 36 as the write to the data space 20 is occuring. Such asynchronous moves may be triggered by a write to a next sequential block in the data space. While 4 MB blocks work well for tape I/O, any arbitrary size is within the scope and contemplation of the invention. In the event that data space 20 nears a full state, the VIO 16 slows the rate at which the application 40 is permitted to transfer data over path 50. Generally, because the entire write from the application 40 of the data space 20 takes place on board mainframe 10, that transaction is very fast. Once the transfer to data space 20 is complete, the application 40 will receive an I/O complete notification and is free to go about its other work and/or release the CPU to process work from another application.

Once the data set has been moved by a path 52 to DASD 36, VIO 16 may migrate the data set out to physical tape 38, along data paths 54 and 56. This moves the data back through CHPID 24 to the data space 20 and then out via CHPID 28 to the physical tape 38. This migration may be delayed for seconds, minutes, days, or any arbitrarily period of time, bearing in mind the DASD resources available and the mainframe resources required for the move. It is noted that conducting the migration consumes a certain amount of mainframe resources. Specifically, a two CHPID penalty is paid. However, data sets may be stacked on physical tapes to achieve much higher tape utilization and vastly reduce the number of physical tape drives required. A reduction on the order of 6 to 1 has been found easily workable.

Figure 2:
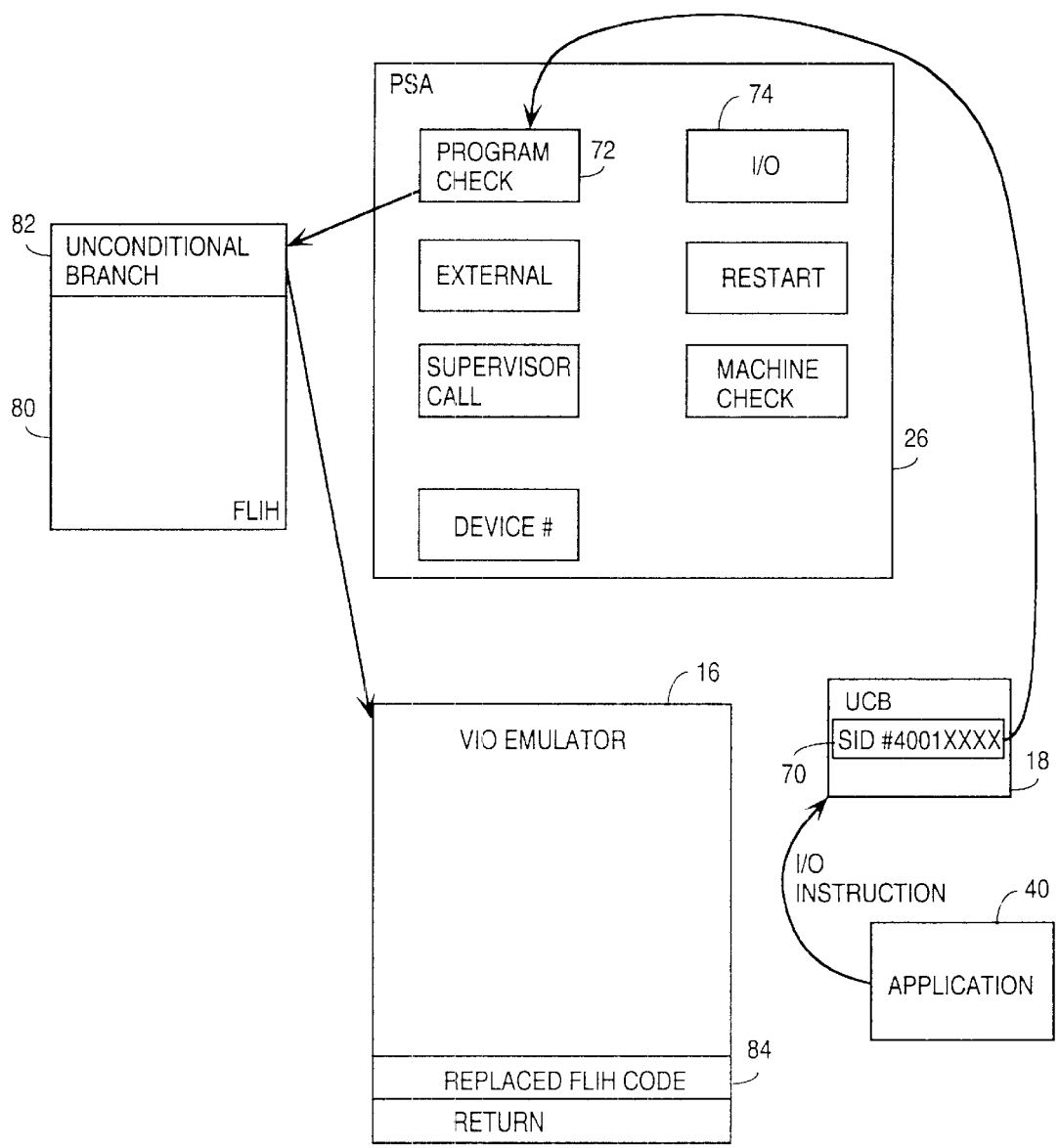
FIG. 2 is a diagram showing how the VIO emulator gains control responsive to the issuance of an I/O instruction.

FIG. 2 is a diagram showing how the VIO emulator gains control responsive to the issuance of an I/O instruction. An application 40 issues an I/O instruction which is translated and ultimately goes to UCB 18 to obtain SID 70. The UCB 18 also retains a pointer to an I/O queue (IOQ) which contains blocks of channel command words (CCWs) that define the I/O transaction to be conducted.

SID 70 is used as an operand for the translated I/O instruction. To be a valid operand for an I/O instruction, the most significant four hex digits must be 0001. By altering the SID to have the most significant digits be 4001 (or anything other than 0001), it is ensured that an interrupt will be generated when that SID is used as an I/O operand. Particularly, a program check interrupt will be generated. The CPU then gets the branch address from the program check register 72 in PSA 26 and branches to a first level interrupt handler (FLIH) 80 supplied by the operating system.

By modifying the beginning of the FLIH 80 to be an unconditional branch 82 to the VIO emulator 16, the VIO emulator obtains control responsive to the program check interrupt. Notably, because the operating systems loads the program check register 72 independent of the VIO emulator, it is necessary to overwrite a portion of the FLIH 80 with the unconditional branch 82. Thus, when VIO emulator 16 determines that the program check interrupt was not caused by its special case, it must execute the code 84 replaced by the unconditional branch 82 before returning control to the FLIH 80 for handling of the interrupt in the usual manner. Operation of the VIO emulator is described in more detail below.

In an alternative embodiment, rather than replace an initial portion of FLIH 80 with an unconditional branch, the PC register 72 in PSA 26 could be programmed at initialization to contain a branch to VIO. However, certain tests for corruption of the PSA may result in the PC register being reprogrammed to branch to the FLIH 80 and, therefore, an unintentional deinstallation of VIO. Accordingly, branching from the FLIH 80 is preferred.

Figure 3:
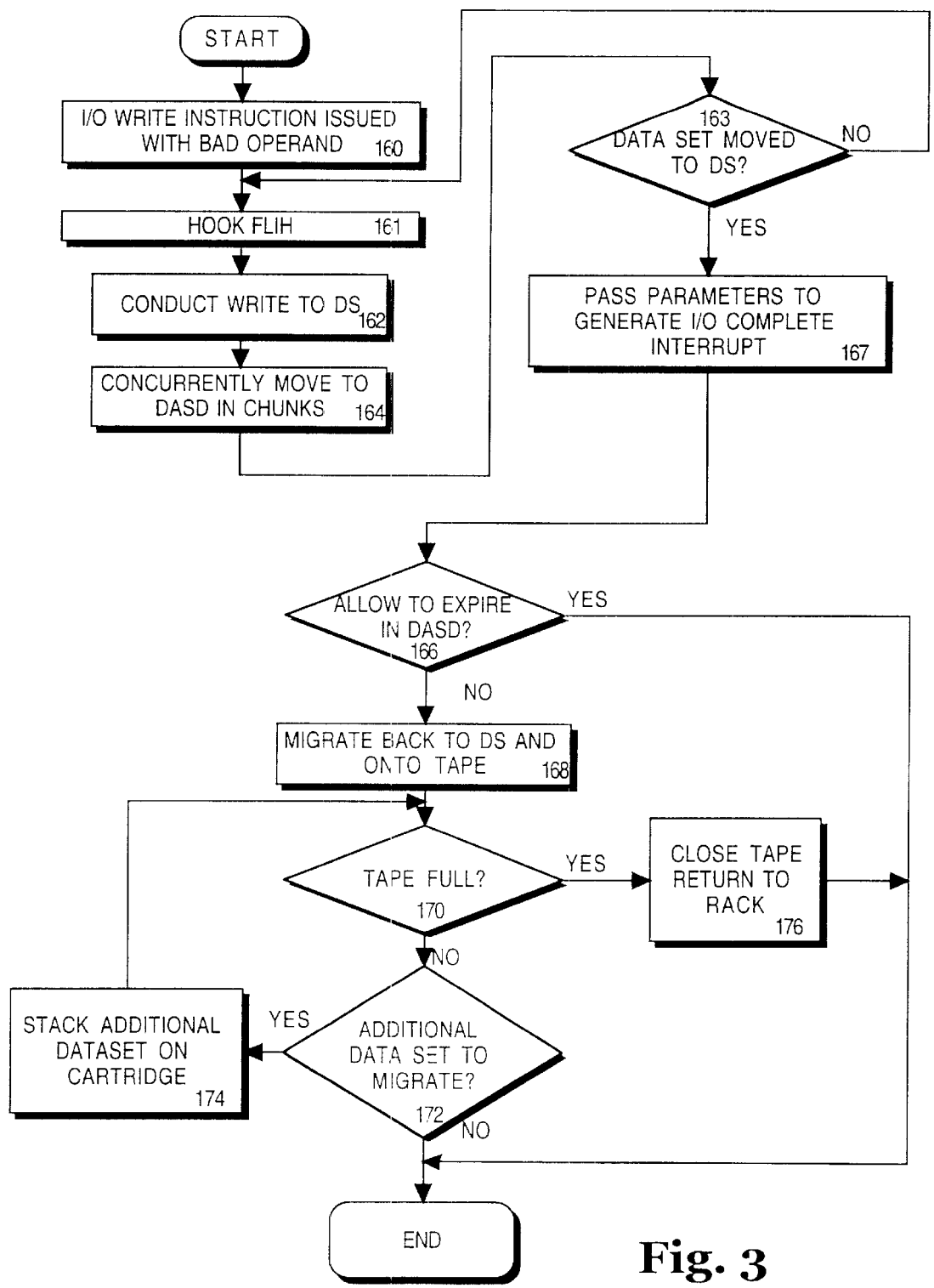
FIG. 3 is a high-level flow diagram of operation of an I/O write in one embodiment of the invention.

FIG. 3 is a high-level flow diagram of operation of an I/O write in one embodiment of the invention. An I/O write instruction is issued at functional block 160. Because the write incorporates an illegal operand corresponding to a virtual device, an interrupt occurs and control is passed to the FLIH. However, the FLIH has been hooked, and therefore, passes control to the VIO emulator. The VIO emulator conducts a write on the defined data space in the general storage at functional block 162. Concurrently, as data is written to the data space, the VIO emulator moves it to DASD in chunks at functional block 164. For example, if the chunk size is set to 4 MB, while the first 4 MB of the data set are written to the data space, nothing will be written out to DASD. However, once a chunk completes, that 4 MB chunk will be moved to DASD while the next 4 MB chunk comes in to the data space. Movement to DASD continues until the entire data set has been moved out to the DASD farm. However, it is possible that the application will be able to fill its data space faster than the data can be moved to DASD. Thus, in some cases, it may be necessary for the VIO to slow the transfer rate between the application and the data space.

At decision block 163, a determination is made if the entire data set has been written to the data space. If it has not, additional writes are conducted to the data space at functional block 162. If it has, the emulator places the appropriate parameters in a PSA and branches to the I/O interrupt branch point of that PSA to cause an I/O interrupt complete interruption to notify the application that its I/O has been completed at functional block 167. No changes to the I/O FLIH are required for this operation.

In decision block 166, a determination is made whether it is desirable to allow the data set to expire on DASD or if it should be migrated to tape. The criteria for this decision may include the length of time the data set is to be retained, by way of example, if the data set is to be retained only hours or a day or two, it may be desirable to just retain it in DASD and allow it to expire there. However, if the retention is on the order of years, migration to tape is clearly preferred. Additionally, the size of the file will affect how long the file is retained in DASD. Large files which consume excessive DASD resources may be desirable to migrate sooner, even if their relative retention period is fairly short. Allowing the data set to expire in DASD avoids the two CHIPD penalty discussed with reference to FIG. 1.

If the data set is not to be allowed to expire in DASD, it will be migrated back to the data space and then onto tape at functional block 168. This is performed asychronously and, as previously mentioned, can be seconds, minutes, hours, or days later than the initial write out to DASD. Once it is written out to tape, a decision is made at decision block 170 whether the tape is full. If the tape is not full, a determination is made if there are additional data sets to migrate at decision block 172. If there are, those additional data sets may be stacked on the single tape cartridge at functional block 174. If a tape is full at decision block 170, the VIO causes the tape to be closed and return to a rack at functional block 176. Once returned to the rack, or if there are no additional sets to migrate, the routine ends. It should be clear from the above discussion, that migration to tape is asychronous and may be performed at a time convenient to the mainframe. Thus, this migration should not severely impact mainframe resources. It is also noted that the flow diagram of FIG. 3 may be implanted by several different subroutines and different service request blocks may be responsible for migration of different data sets.

Figure 4:
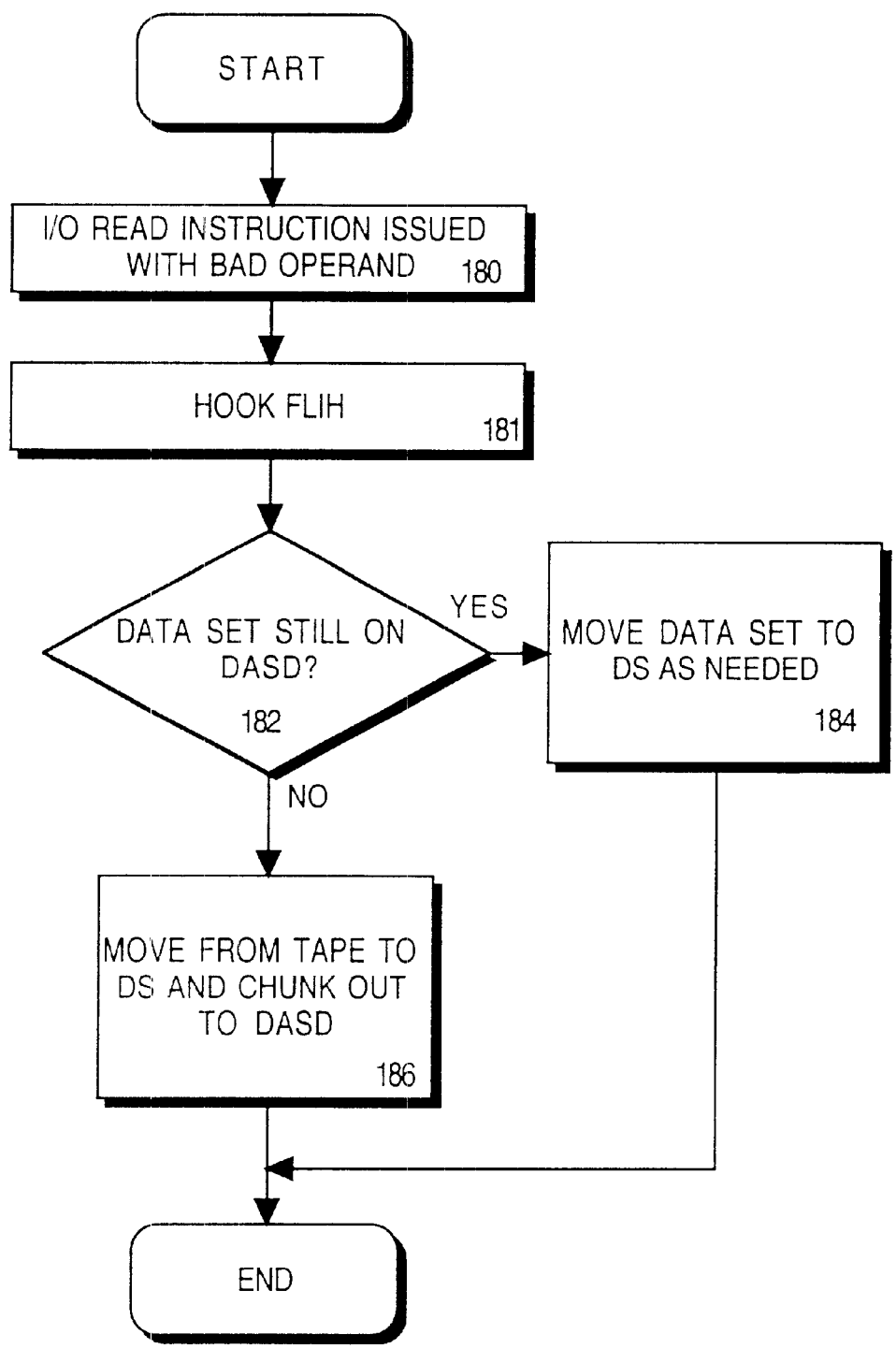
FIG. 4 is a high-level flow diagram of a read operation in one embodiment of the invention.

FIG. 4 is a high-level flow diagram of a read operation in one embodiment of the invention. At functional block 180, an I/O read instruction with a bad operand is issued. At functional block 181, the virtual I/O emulator hooks the FLIH and takes control of processing the interrupt. A determination is made at decision block 182 if the data set to be read is still on DASD. If it is, the data set is moved from DASD to the data space as needed and supplied to the requesting application at functional block 184. If a data set is not still on DASD, a data set is retrieved from tape to the data space and chunked out to DASD at functional block 186, as the data set arrives in data space, it is made available to the requesting application. Additionally, different parts of the data set not retained in the data space (where the data space is too small to contain the entire data set) can subsequently be recovered from DASD as needed. In this manner, the concerns related to the prior art stacking of data sets on a single tape are substantially alleviated. Particularly, because the data set may be retrieved from tape rapidly and moved off to DASD, the monopolization of a tape cartridge by a particular application may be on the order of minutes, where in the prior art because of the way tape is accessed during batch jobs, the monopolization may have been on the order of tens of minutes or hours.

Figure 5:
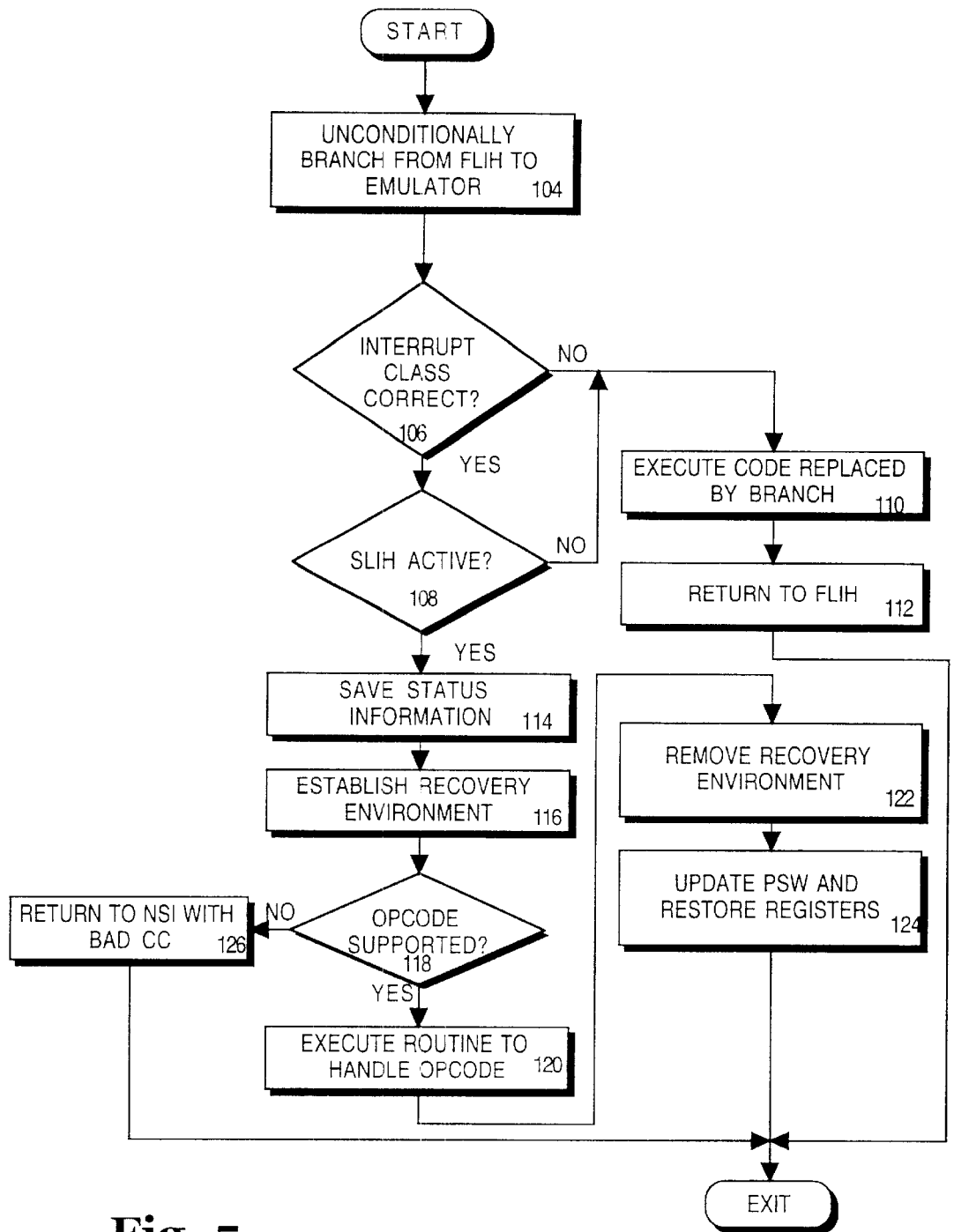
FIG. 5 is a flow diagram of the VIO handling an interrupt.

FIG. 5 is a flow diagram of the VIO handling an interrupt. At functional block 104, the unconditional branch installed in FLIH causes a branch to the emulator. The emulator quickly checks at decision block 106 if the interrupt class is correct. If the class of the interrupt as reflected in the PSA is an operand exception, a determination is made at decision block 108 whether the emulator's second level interrupt handler (SLIH) is active. If SLIH is not active or if the interrupt class is not the correct class at decision block 106, the emulator executes the code replaced by the unconditional branch at functional block 110. Then at functional block 112, a return to FLIH occurs and handling of the interrupt is effectively handed back to be handled by the traditional interrupt handler.

If instead, the SLIH is active at decision block 108, VIO saves the existing status information at functional block 114. Then at functional block 116, a recovery environment is established. Establishing a recovery routine to permit recovery in the event of code failure is generally well-known in the art. A determination is made at decision block 118 whether the opcode of the instruction is one supported by the VIO emulator. If it is, a routine is executed to handle that particular opcode at functional block 120. Several such routines are described with reference to FIGS. 6–12 below. Once the opcode has been handled at functional block 120, a recovery environment previously established is removed at functional block 122. The system then updates the program status word and restores the registers at functional block 124. If the opcode is not supported at decision block 118, the emulator returns to the next sequential instruction in the application after sending a bad completion code in the program status word at functional block 126.

Figure 6:
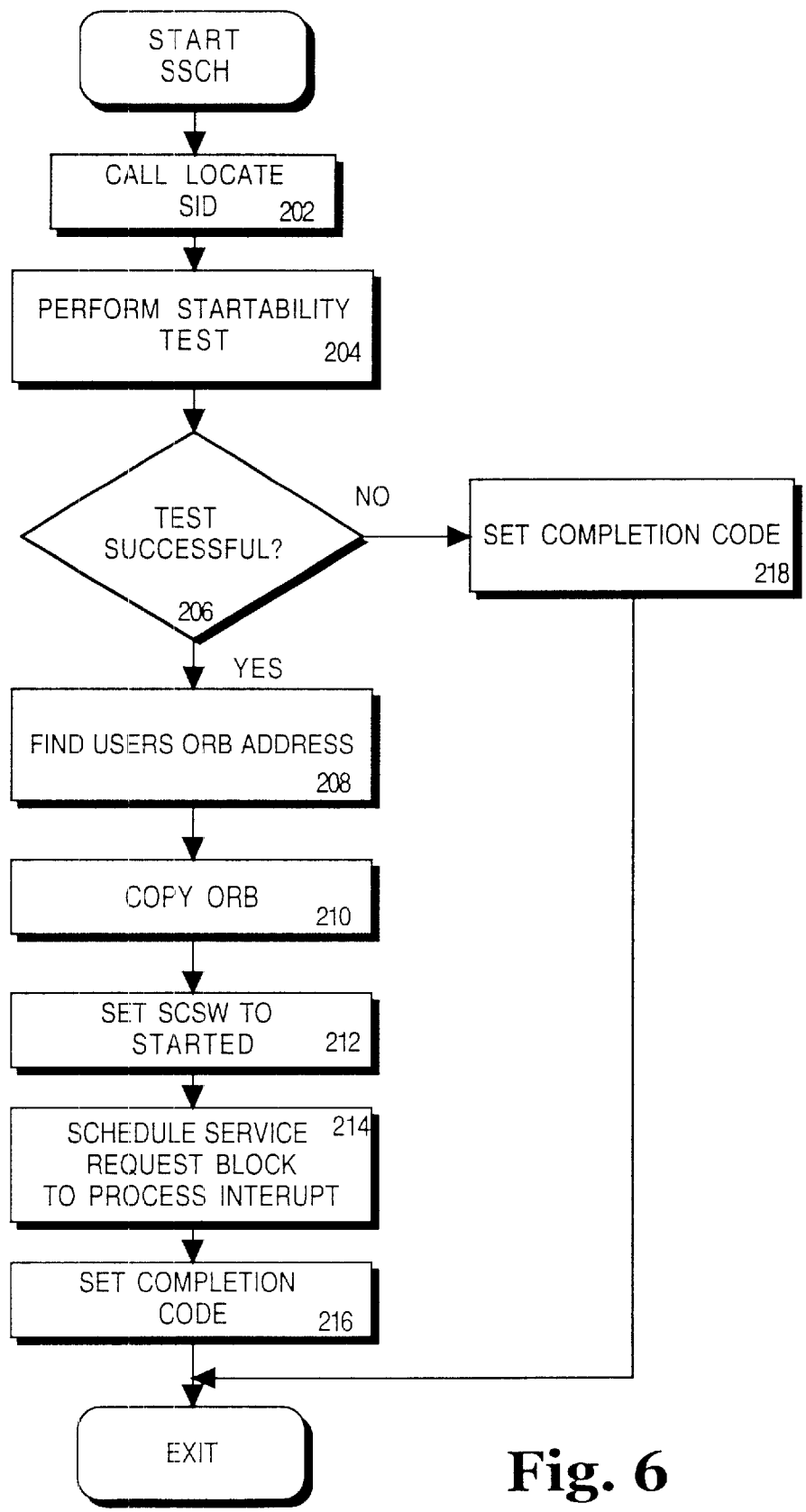
FIG. 6 is a flow chart of a start subchannel routine of one embodiment of the invention.

FIG. 6 is a flow chart of a start subchannel routine of one embodiment of the invention. This routine is called by the SLIH responsive to an identification of a start subchannel instruction. At functional block 202, the SSCH routine calls locate SID, which is separately described with reference to FIG. 14 below. At functional block 204, based on the SID returned, a startability test is performed. A determination is made at decision block 206 if the test was successful. If the test was successful, a user's operation request block (ORB) address is found at functional block 208. Using that address, the ORB is copied at functional block 210. Once the ORB is copied, the subchannel status word (SCSW) is set to indicate a start function has been initiated at functional block 212. Then at functional block 214, a service request block (SRB) is scheduled to process the interrupt asynchronously. The operation of the SRB will be discussed in more detail with reference to FIG. 13 below.

The program status word (PSW) is then set to contain a completion code reflecting that the function has been initiated. Conversely, if the test at decision block 206 was unsuccessful, the PSW is set to have a completion code of busy at functional block 218.

Figure 7:
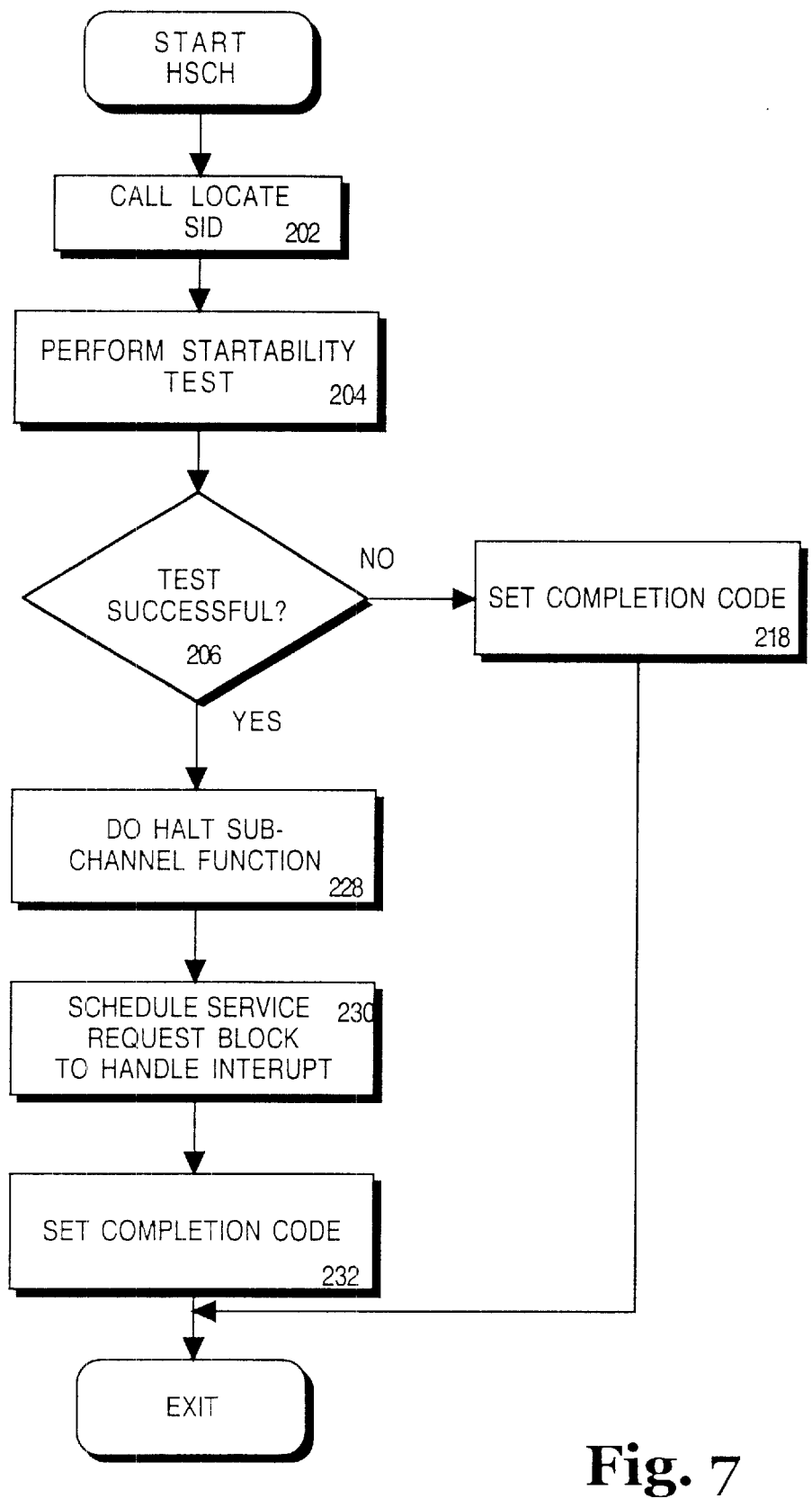
FIG. 7 is a flow chart of the halt subchannel instruction in one embodiment of the invention.

FIG. 7 is a flow chart of the halt subchannel (HSCH) routine in one embodiment of the invention. This routine is called by the SLIH at functional block 120 responsive to the identification of an HSCH instruction. A logic flow of HSCH is similar to the SSCH routine described above. However, after the determination at decision block 206, if the test is successful, a halt subchannel function is performed at functional block 228. Then, at functional block 230, an SRB is scheduled to handle the interrupt to simulate I/O completion. This SRB is discussed in more detail with respect to FIG. 16 below. Then at functional block 232, the PSW word is returned with a completion code indicating that the transaction was initiated.

Figure 8:
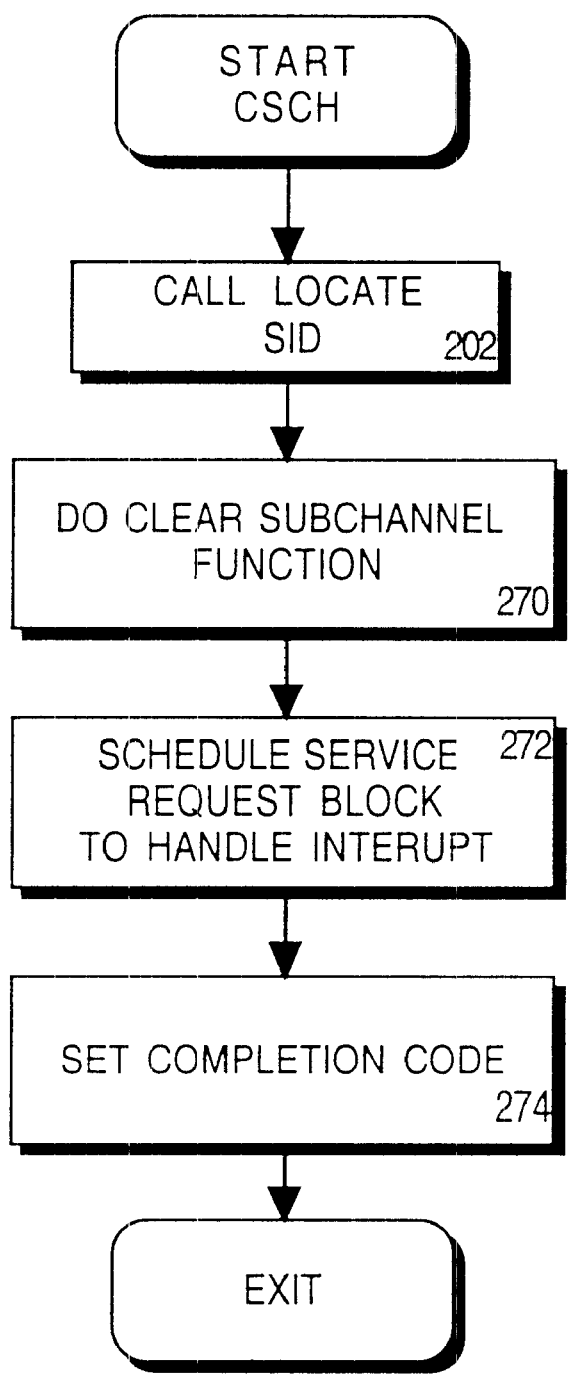
FIG. 8 is a flow chart of the clear subchannel routine of one embodiment of the invention.

FIG. 8 is a flow chart of the clear subchannel (CSCH) routine of one embodiment of the invention. This routine is called by the SLIH at functional block 120 responsive to the identification of an CSCH instruction. At functional block 202, the routine calls locate SID. Then at functional block 270, the routine performs a clear subchannel function. Then at functional block 230, a routine schedules a service request block to handle an interrupt. This step is substantially identical to that performed in functional block 230 described with reference to FIG. 7 above. Then, at functional block 274, the PSW is returned with a completion code indicating that the function has been initiated.

Figure 9:
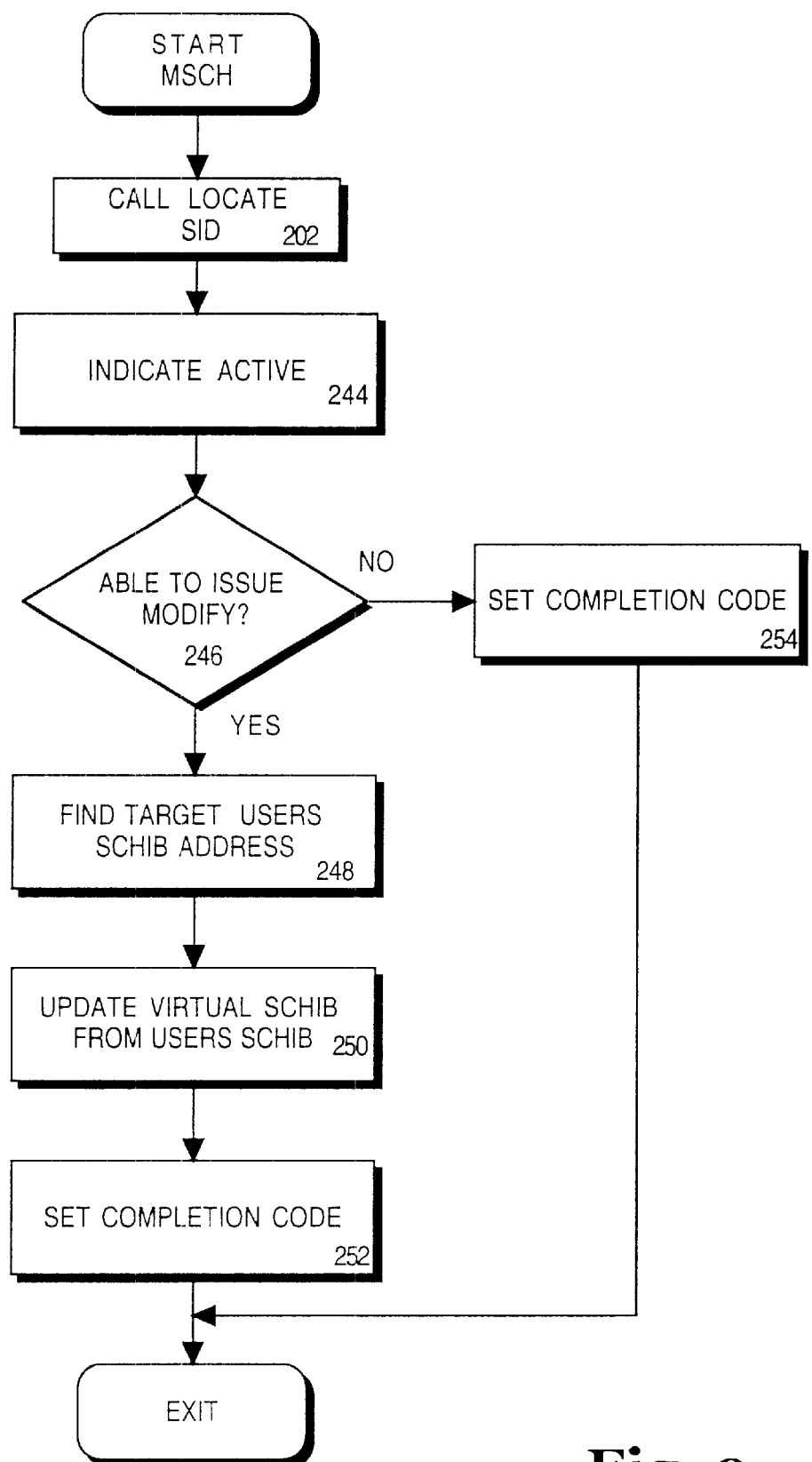
FIG. 9 is a flow chart of a modified subchannel routine of one embodiment of the invention.

FIG. 9 is a flow chart of a modify subchannel (MSCH) routine of one embodiment of the invention. This routine is called by the SLIH at functional block 120 responsive to the identification of an MSCH instruction. At functional block 202, the routine calls locate SID. Then, at functional block 244, a write-to operator (WTO) is issued conditionally based on a level of user-initiated tracing to indicate that the routine was active. A determination is then made at decision block 246 whether it is possible to issue a modify subchannel instruction. If it is, the routine finds the address of the user subchannel information block at functional block 248. Then using that address, at functional block 250, the virtual SCHIB is updated from the user's SCHIB. Then, at functional block 252, the completion code is set to function initiated. If the determination at decision block 246 is that it is not possible to issue the modify, the completion code is set to device busy at functional block 254.

Figure 10:
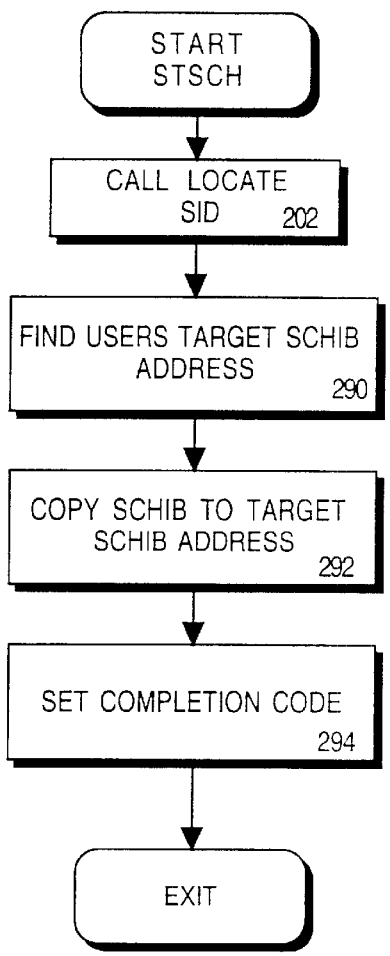
FIG. 10 is a flow chart of a store subchannel routine of one embodiment of the invention.

FIG. 10 is a flow chart of a store subchannel (STSCH) routine of one embodiment of the invention. This routine is called by the SLIH at functional block 120 responsive to the identification of an STSCH instruction. At functional block 202, the routine calls locate SID. Then, at functional block 290, the user's target SCHIB address is found. At functional block 292, a virtual SCHIB is copied to the target SCHIB address. Then, at functional block 294, a completion code is set to function initiated.

Figure 11:
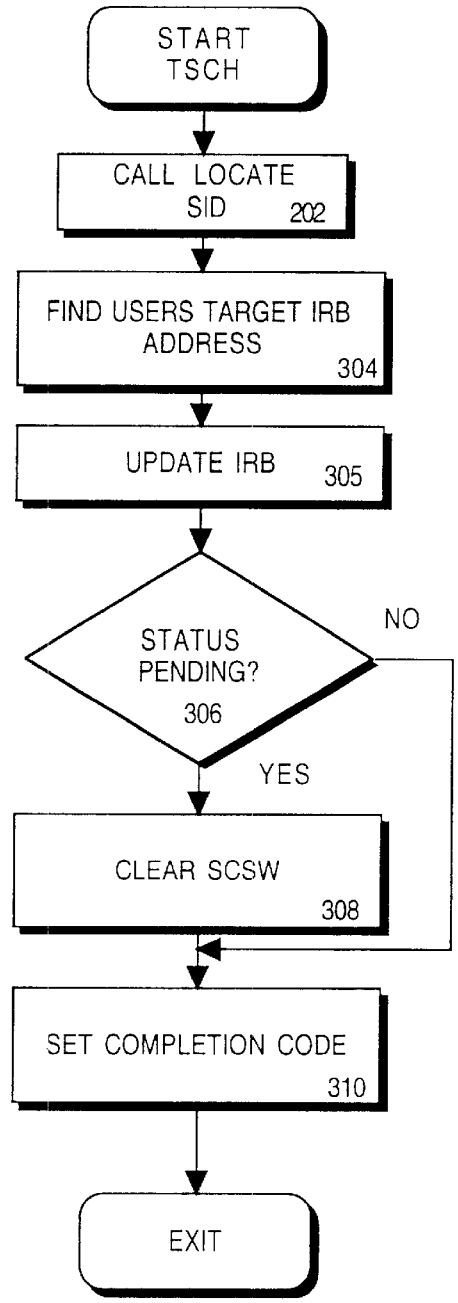
FIG. 11 is a flow diagram of a test subchannel routine of one embodiment of the invention.

FIG. 11 is a flow diagram of a test subchannel (TSCH) routine of one embodiment of the invention. This routine is called by the SLIH at functional block 120 responsive to the identification of an TSCH instruction. At functional block 202, the routine calls locate SID. At functional block 304, the user's target interrupt request block is found. The IRB is then updated at functional block 305. A determination is made at decision block 306 if the status is pending. If the status is pending, the routine clears the subchannel status word at functional block 308. If the status is not pending or after clearing the subchannel status word, the routine sets the completion code to function initiated at functional block 310.

Figure 12:
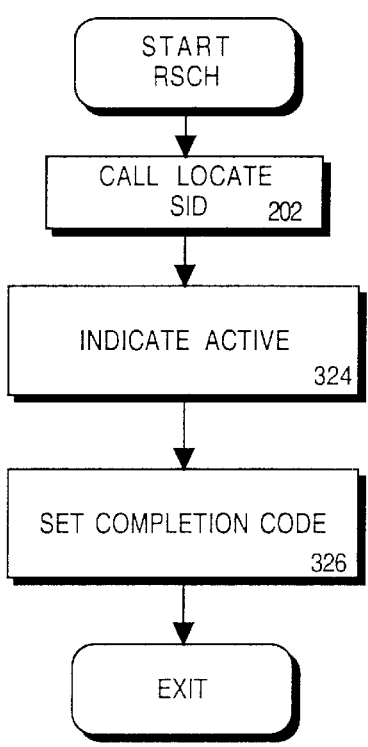
FIG. 12 is a flow diagram of a resume subchannel routine of one embodiment of the invention.

FIG. 12 is a flow diagram of a resume subchannel routine (RSCH) of one embodiment of the invention. This routine is called by the SLIH at functional block 120 responsive to the identification of an RSCH instruction. At functional block 202, the routine calls locate SID. At functional block 324, the routine conditionally issues a WTO base on a level of user-initiated tracing to indicate that it was active. Then at functional block 326, the completion code is set to indicate that a function has been initiated.

Figure 13:
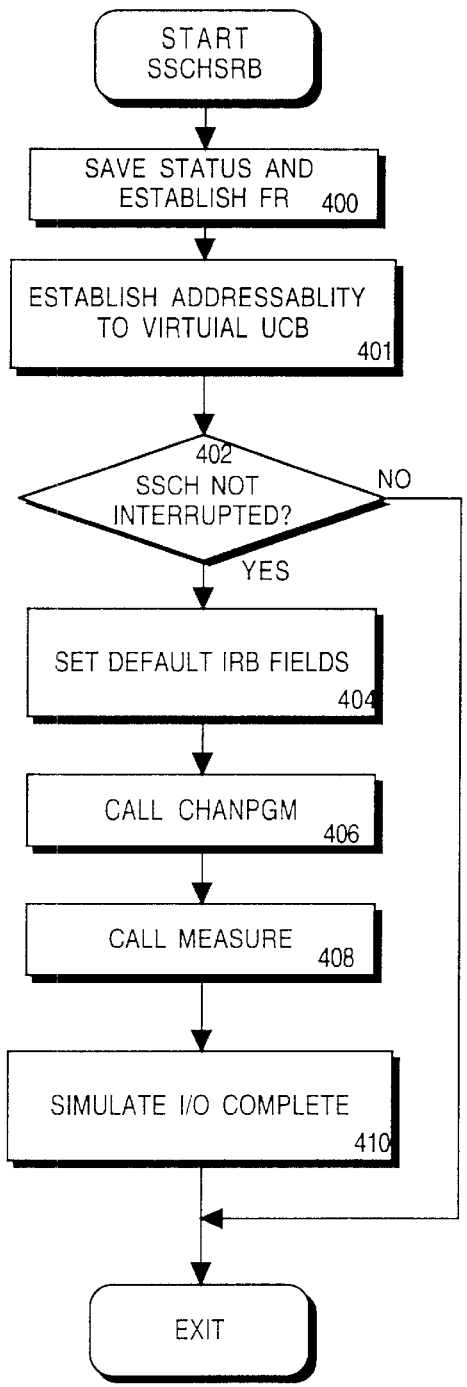
FIG. 13 is a flow chart of the service request block scheduled in response to an SSCH function.

FIG. 13 is a flow chart of the service request block scheduled in response to an SSCH function. This SRB performs the function of a control unit during an SSCH instruction. At functional block 400, the status is saved and a functional recovery routine is established. Then at functional block 401, the SRB establishes addressability to the UCBs corresponding to a virtual I/O device. At functional block 402, it is determined whether the start subchannel command was interrupted by, for example, a clear subchannel or a halt subchannel. If it was, the routine exits. If it was not interrupted, the default IRB fields are set at functional block 404. A routine then calls channel program at functional block 406. Channel program is basically a series of subroutines corresponding to different possible channel command words and each designed to provide the signaling necessary for the hardware to believe that the command word has been physically executed. Because the various command words and their return parameters are defined by the hardware vendors, one of ordinary skill in the art will be able to produce the routines necessary to implement any particular command word and the particular coding of any such routine is merely a matter of design choice. The service request block then calls the function measure at functional block 408. Measure effectively logs certain performance statistics related to the operation of the service request block. Then at functional block 410, the unit of work becomes disabled so that it cannot be interrupted. The control register zero is modified to allow updating the interruption parameter in the low address protection area. It then calls the I/O FLIH with the load program status word (LPSW) instruction to pass the parameters corresponding to I/O complete on the virtual device.

Figure 14:
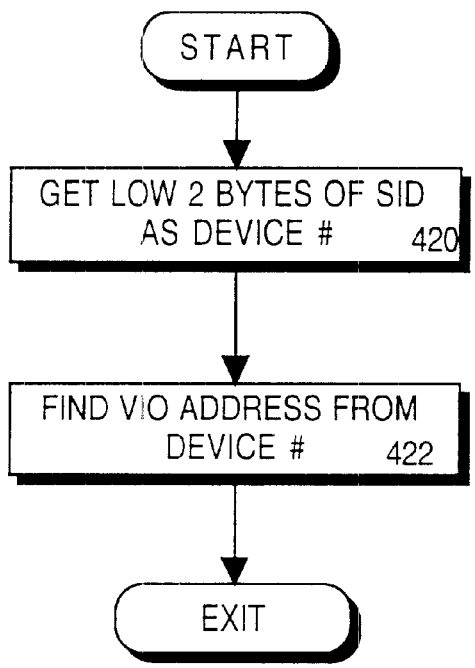
FIG. 14 is a flow diagram of the routine locate SID.

FIG. 14 is a flow diagram of the routine locate SID at functional block 420. The UCB containing the SID is accessed and the low two bytes of the SID are obtained as the device number. Then at functional block 422, from the device number, the virtual I/O address is determined. The virtual I/O address is returned to calling routine.

Figure 15:
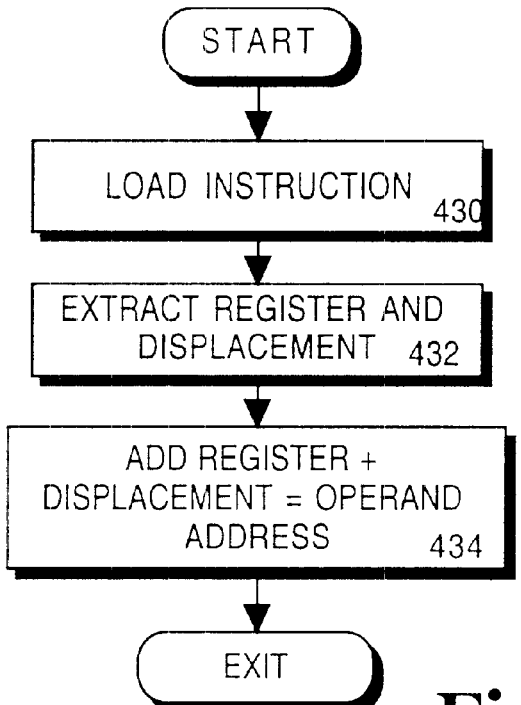
FIG. 15 is a flow diagram of an operand routine used to locate a caller's input operand in one embodiment of the invention.

FIG. 15 is a flow diagram of an operand routine used to locate a caller's input operand in one embodiment of the invention. At functional block 430, an instruction is loaded into a register. Then at functional block 432, the routine extracts the register and the displacement from the instruction. The routine then adds the register and the displacement to obtain an operand address at functional block 434.

Figure 16:
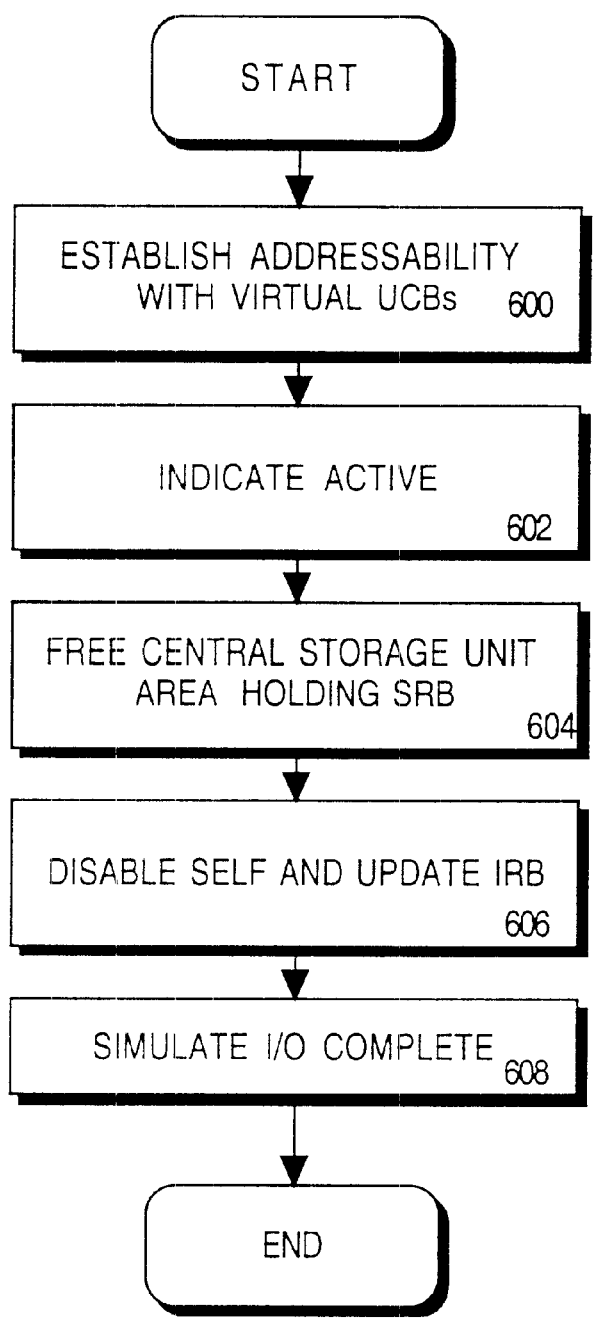
FIG. 16 is a flow diagram of the interrupt service request block scheduled by the HSCH or CSCH routines of one embodiment of the invention.

FIG. 16 is a flow diagram of the interrupt service request block scheduled by the HSCH or CSCH routines of one embodiment of the invention. At functional block 600, the SRB establishes addressability with the virtual UCBs. Then at functional block 602, it conditionally issues a WTO base on a user-initiated level of tracing to indicate that it has been active. It then frees the central storage unit area corresponding to its SRB storage which is returned at functional block 604. At functional block 606, the SRB disables itself and updates the interrupt request block. At functional block 608, the control register zero is modified to allow updating the interruption parameter in the low address protection area. It then calls the I/O FLIH with the LPSW instruction to pass the parameters corresponding to I/O complete on the virtual device.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:

allocating, in a general storage unit, a data space associated with an input/output (I/O) instruction of a target I/O device distinct from the general storage unit;

performing the I/O instruction through the data space while emulating performance of the transaction with the target I/O device;

moving the data from the data space to a first I/O device if the instruction is a write instruction;

determining whether to move the data from the first I/O device to the target I/O device based on storage criteria; and moving the data from the first I/O device to the data space if the instruction is a read instruction.

2. The method of claim 1 wherein causing an interrupt comprises:

defining a unit control block (UCB) having a subchannel identification value which when used as an operand in the I/O instruction generates a program check interrupt.

3. The method of claim 1 wherein the storage criteria comprises the length of time the data is to be retained.

4. The method of claim 1 wherein the transaction is a write further comprising:

moving the data from the first I/O device to the target I/O device transparently to the application.

5. The method of claim 1 wherein the first I/O device is a direct access storage device (DASD) and the target I/O device is a physical tape device.

6. The method of claim 5 wherein a plurality of applications have written a plurality of datasets to tape further comprising:

stacking a subset of the data sets on a tape cartridge when the data sets are moved from DASD to physical tape to increase cartridge utilization.

7. The method of claim 1 further comprising:

moving an outbound data set to a first I/O device that is not the target I/O device.

8. The method of claim 7 further comprising:

expiring the outbound data set in the first I/O device without moving it to the target I/O device.

9. The method according to claim 1 and further comprising:

causing an interrupt responsive to an attempt to execute the input/output (I/O) instruction; and wherein the interrupt is caused in response to an illegal operand.

10. A system comprising:

a mainframe computer having a general storage unit;

a first I/O device coupled to a first subchannel of the mainframe computer;

a second I/O device coupled to a second subchannel of the mainframe computer;

a started task executing as part of an operating system (O/S) of the mainframe computer, the started task operable to:

emulate transactions between an application on the mainframe and the second I/O device;

move the data from the general storage unit to the first I/O device if the transaction is a write transaction;

determine whether to move the data from the first I/O device to the second I/O device based on predetermined storage criteria; and move the data from the first I/O device to the data space if the transaction is a read transaction.

11. The system of claim 10 wherein the started task defines a subchannel identification number (SID) by which the application may involve a transfer to a virtual I/O device, the started task defining a data space within the general storage unit, the application writing data to or reading data from the data space, the started task transferring data written to the first I/O device in chunks;

the started task subsequently transferring the data from the first I/O device to the second I/O device.

12. The system of claim 10 wherein the first I/O device is a direct access storage device and wherein the second I/O device is a tape drive and wherein the storage criteria comprises the length of time the data is to be retained.

13. The system of claim 10 further comprising:

a plurality of unit control blocks (UCB) retained in the common area of the general storage, a subset of the plurality corresponding to a plurality of virtual I/O devices, each UCB of the subset defined to contain an illegal subchannel identification number (SID).

14. The system of claim 13 further comprising:

a program check first level interrupt handler (FLIH); and a second level interrupt handler (SLIH), the SLIH being part of the started task, wherein the FLIH unconditionally branches to the SLIH on any program check interrupt.

15. A computer readable storage media containing executable computer program instructions which when executed cause a digital processing system to perform a method comprising:

allocating, in a general storage unit, a data space associated with an input/output (I/O) instruction of a target I/O device distinct from the general storage unit;

performing the I/O instruction through the data space while emulating performance of the transaction with the target I/O device;

moving the data from the data space to a first I/O device if the instruction is a write instruction;

determining whether to move the data from the first I/O device to the target I/O device based on storage criteria; and moving the data from the first I/O device to the data space if the instruction is a read instruction.

16. The computer readable storage media of claim 15 which when executed cause a digital processing system to perform a method further comprising:

defining a unit control block (UCB) having a subchannel identification value which when used as an operand in the I/O instruction generates a program check interrupt.

17. The computer readable storage media of claim 15 which when executed cause a digital processing system to perform a method further comprising:

moving an outbound data set to a first I/O device that is not the target I/O device.

18. The computer readable storage media of claim 17 which when executed cause a digital processing system to perform a method further comprising:

expiring the outbound data set in the first I/O device without moving it to the target I/O device.

19. The computer readable storage media of claim 17 which when executed cause a digital processing system to perform a method further comprising:

migrating the outbound data set to the target device, wherein the target device is a tape drive; and wherein the storage criteria comprises the length of time the data is to be retained.

20. The computer readable storage media of claim 17 which when executed cause a digital processing system to perform a method further comprising:

stacking a plurality of the data sets on a tape cartridge when the data sets are moved from the first I/O device to a physical tape to increase cartridge utilization.

21. A system comprising:

means for allocating, in a general storage unit, a data space associated with an input/output (I/O) instruction of a target I/O device distinct from the general storage unit;

means for performing the I/O instruction through the data space while emulating performance of the transaction with the target I/O device;

means for moving the data from the data space to a first I/O device if the instruction is a write instruction;

means for determining whether to move the data from the first I/O device to the target I/O device based on storage criteria; and means for moving the data from the first I/O device to the data space if the instruction is a read instruction.

22. A method for performing input/output (I/O) transactions, comprising:

receiving an I/O instruction from an application for a transaction with a target I/O device;

causing an interrupt response to in an attempt execute the I/O instruction;

allocating a data space in a general storage unit including the application for transactions with a disparate I/O device; and performing the transaction through the data space with the disparate I/O device while emulating performance of the transaction with the target I/O device;

moving the data from the data space to the disparate I/O device if the instruction is a write instruction;

determining whether to move the data from the disparate I/O device to the target I/O device based on storage criteria; and moving the data from the disparate I/O device to the data space if the transaction is a read instruction.

23. The method of claim 22, wherein the interrupt comprises a program check (PC) interrupt.

24. The method of claim 22, wherein the disparate I/O device comprises a direct access storage device (DASD) and the target I/O device comprises a physical tape device and wherein the criteria comprises the length of time the data is to be retained.

25. The method of claim 22, further comprising causing the interrupt response to the attempt to execute the I/O instruction by including an invalid operand in the I/O instruction.

26. The method of claim 22, further comprising branching unconditionally to a virtual emulator for performing the transaction through the data space in response to the interrupt.

27. A system for performing input/output (I/O) transactions, comprising:

means for receiving an I/O instruction from an application for a transaction with a target I/O device;

means for causing an interrupt response to an attempt execute the I/O instruction;

means for allocating a data space in a general storage unit including the application for transactions with a disparate I/O device;

means for performing the transaction through the data space with the disparate I/O device while emulating performance of the transaction with the target I/O device;

means for moving the data from the data space to the disparate I/O device if the instruction is a write instruction;

means for determining whether to move the data from the disparate I/O device to the target I/O device based on storage criteria; and means for moving the data from the disparate I/O device to the data space if the transaction is a read instruction.

28. The system of claim 27, wherein the interrupt comprises a program check (PC) interrupt.

29. The system of claim 27, wherein the disparate I/O device comprises a direct access storage device (DASD) and the target I/O device comprises a physical tape device.

30. The system of claim 27, further comprising means for causing the interrupt response to the attempt to execute the I/O instruction by including an invalid operand in the I/O instruction.

31. The system of claim 27, further comprising means for branching unconditionally to a virtual emulator for performing the transaction through the data space in response to the interrupt.

32. A computer readable storage media containing executable computer program instructions which when executed cause a digital processing system to perform a method comprising:

receiving an I/O instruction from an application for a transaction with a target I/O device;

causing an interrupt response to in an attempt execute the I/O instruction;

allocating a data space in a general storage unit including the application for transactions with a disparate I/O device;

performing the transaction through the data space with the disparate I/O device while emulating performance of the transaction with the target I/O device;

moving the data from the data space to the disparate I/O device if the instruction is a write instruction;

determining whether to move the data from the disparate I/O device to the target I/O device based on storage criteria; and moving the data from the disparate I/O device to the data space if the transaction is a read instruction.

33. A method comprising:

causing an interrupt responsive to an attempt to execute a write instruction associated with a tape device;

allocating a data space in a general storage unit distinct from the tape device to store data associated with the write instruction;

storing the data associated with the write instruction in the data space while emulating performance of the transaction with the tape device;

moving the data from the general storage unit to a direct access storage device;

determining whether to move the data from the general storage unit from the direct access storage device based on a chunk size; and determining whether to move the data from the direct access storage device to the tape device based on predetermined criteria.

34. The method according to claim 33 further comprising:

stacking data on a tape associated with the tape device;

attempting to substantially fill the tape with data.

35. The method according to claim 34, wherein the data comprises a plurality of distinct data sets.

36. The method according to claim 34, wherein the criteria comprises a length of time the data set is to be retained.

37. A system comprising:

means for causing an interrupt responsive to an attempt to execute a write instruction associated with a tape device;

means for allocating a data space in a general storage unit distinct from the tape device to store data associated with the write instruction;

means for storing the data associated with the write instruction in the data space while emulating performance of the transaction with the tape device;

means for moving the data from the general storage unit to a direct access storage device;

means for determining whether to move the data from the general storage unit from the direct access storage device based on a chunk size; and means for determining whether to move the data from the direct access storage device to the tape device based on predetermined criteria.

38. A computer readable storage media containing executable computer program instructions which when executed cause a digital processing system to perform a method comprising:

causing an interrupt responsive to an attempt to execute a write instruction associated with a tape device;

allocating a data space in a general storage unit distinct from the tape device to store data associated with the write instruction;

storing the data associated with the write instruction in the data space while emulating performance of the transaction with the tape device;

moving the data from the general storage unit to a direct access storage device;

determining whether to move the data from the general storage unit from the direct access storage device based on a chunk size; and determining whether to move the data from the direct access storage device to the tape device based on predetermined criteria.

* * * * *